US009536502B2

(12) United States Patent
Yura et al.

(10) Patent No.: US 9,536,502 B2
(45) Date of Patent: Jan. 3, 2017

(54) SCREEN DISPLAY BASED ON THE INTER-SCREEN RELATIONSHIP

(71) Applicant: FUJITSU LIMITED, Kawasaki-shi, Kanagawa (JP)

(72) Inventors: Junichi Yura, Yokohama (JP); Takashi Ohno, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 343 days.

(21) Appl. No.: 13/751,432

(22) Filed: Jan. 28, 2013

(65) Prior Publication Data

US 2013/0194300 A1 Aug. 1, 2013

(30) Foreign Application Priority Data

Jan. 31, 2012 (JP) ................................ 2012-019129

(51) Int. Cl.
*G06F 17/00* (2006.01)
*G09G 5/377* (2006.01)
*G09G 5/14* (2006.01)

(52) U.S. Cl.
CPC ................ *G09G 5/377* (2013.01); *G09G 5/14* (2013.01); *G09G 2340/0407* (2013.01); *G09G 2370/042* (2013.01)

(58) Field of Classification Search
CPC ........................... G06F 3/0481; G06F 3/04842
USPC ................................. 715/243–253, 788–900
See application file for complete search history.

(56) References Cited

U.S. PATENT DOCUMENTS

| | | | | |
|---|---|---|---|---|
| 5,712,995 | A * | 1/1998 | Cohn | 715/792 |
| 2007/0074129 | A1* | 3/2007 | Baumann | H04N 7/181 715/764 |
| 2008/0307364 | A1* | 12/2008 | Chaudhri | G06F 3/0483 715/836 |
| 2009/0031247 | A1* | 1/2009 | Walter et al. | 715/788 |
| 2010/0110072 | A1* | 5/2010 | Nakayama | G06F 3/04815 345/419 |
| 2012/0096394 | A1* | 4/2012 | Balko | G06F 3/0482 715/790 |
| 2012/0188248 | A1* | 7/2012 | Eames et al. | 345/428 |

FOREIGN PATENT DOCUMENTS

| | | |
|---|---|---|
| JP | 5-204584 | 8/1993 |
| JP | 7-73002 | 3/1995 |

(Continued)

OTHER PUBLICATIONS

W3C "Media Queries", W3C Candidate Recommendation Jul. 27, 2010, Copyright © 2010 W3C®. http://www.w3.org/TR/2010/CR-css3-mediaqueries-20100727/ , 17 pages.

(Continued)

*Primary Examiner* — Weiming He
(74) *Attorney, Agent, or Firm* — Staas & Halsey LLP

(57) ABSTRACT

A display control program causing a processor to execute display control process includes: specifying relationship between a first page screen and a second page screen; allocating the first page screen and the second page screen respectively to a first unit region and a second unit region in one display window in a case that the specified relationship is dependent relationship; and displaying the one display window having the first page screen and the second page screen placed in the first unit region and the second unit region.

7 Claims, 13 Drawing Sheets

(56) References Cited

FOREIGN PATENT DOCUMENTS

| | | | |
|---|---|---|---|
| JP | 9-134305 | | 5/1997 |
| JP | 2006-236205 | | 9/2006 |
| JP | 2011150505 A | * | 8/2011 |

OTHER PUBLICATIONS

Japanese Office Action dated Sep. 8, 2015 in corresponding Japanese Patent Application No. 2012-019129, 3 pages.

* cited by examiner

FIG. 2

| REFERENCE ELEMENT | INTER-SCREEN RELATIONSHIP |
|---|---|
| ORDERED LIST → LIST ELEMENT | SET MEMBERSHIP |
| ELEMENT [TYPE = BUTTON] | PARALLEL |
| ELEMENT [TYPE = HEADER] → ELEMENT [TYPE = BUTTON] | SET MEMBERSHIP |
| ELEMENT [TYPE = BUTTON & NAME = RETURN] | — |
| ... | ... |

FIG. 3

| ID | CHILD ID | INTER-SCREEN RELATIONSHIP |
|---|---|---|
| A | B | CHILD |
| | C | PARALLEL |
| B | A | PARENT |
| ... | ... | ... |

SCREEN DISPLAY BASED ON THE INTER-SCREEN RELATIONSHIP

CROSS-REFERENCE TO RELATED APPLICATION(S)

This application is based upon and claims the benefit of priority of the prior Japanese Patent Application No. 2012-019129, filed on Jan. 31, 2012, the entire contents of which are incorporated herein by reference.

FIELD

The embodiments discussed herein are related to a display control program, a display control device, and a display control method.

BACKGROUND

In recent years, mobile terminals are increasingly diversified and the screens provided in the mobile terminals also have the sizes of a wide variety. For example, between a smart phone and a tablet terminal, both utilizing the Internet, there is a considerable difference in size of the screen devices, i.e., the displays. The optimal screen placement in a "display window" displayed by a web browser application becomes different in accordance with the size of the display.

With that, there is a technique of altering a configuration and placement of a screen that is displayed in a display window and configures one page (hereinafter, may be referred to as a "page screen") in accordance with a display environment, such as a display size. In this technique, by introducing a screen drawing description (for example, CSS: cascading style sheets) that mainly defines the style as well as a screen configuration description (for example, HTML: hypertext markup language), the configuration and placement in one page screen can be altered.

W3C "*CSS Media Queries*", 2010 Jul. 27 is an example of related art.

As a display of a mobile terminal becomes larger, it is desired that more information is displayed on the display at the same time.

However, in a screen display method in the past, since the configuration and placement in one page screen is altered, the amount of information displayed in the display window does not increase even when the display gets larger.

SUMMARY

According to an aspect of the embodiments, a display control program causing a processor to execute display control process includes: specifying relationship between a first page screen and a second page screen; allocating the first page screen and the second page screen respectively to a first unit region and a second unit region in one display window in a case that the specified relationship is dependent relationship; and displaying the one display window having the first page screen and the second page screen placed in the first unit region and the second unit region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a chart representing one example of a relationship standard table in the first embodiment;

FIG. 3 is a chart representing one example of an inter-screen relationship table in the first embodiment;

DESCRIPTION OF EMBODIMENTS

Figure 1:
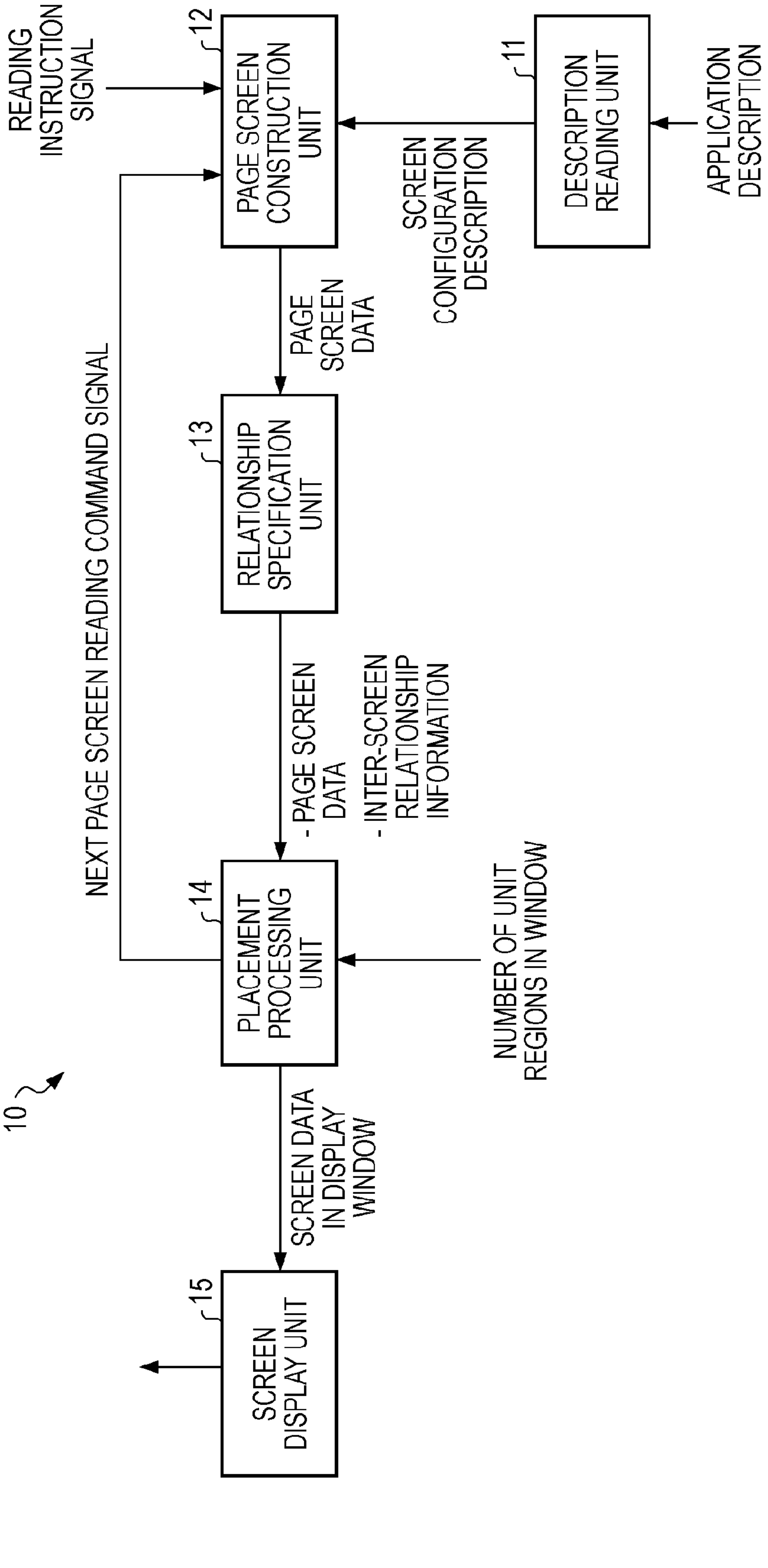
FIG. 1 is a block diagram illustrating one example of a display control device in a first embodiment.

Detailed descriptions are given below to embodiments of a display control program, a display control device, and a display control method disclosed herein based on the drawings. These embodiments do not limit the display control program, the display control device, and the display control method disclosed herein. In the embodiments, an identical reference character is given to configurations having an identical function to omit repetitive descriptions.

First Embodiment

Configuration of Display Control Device 10

FIG. 1 is a block diagram illustrating one example of a display control device in a first embodiment. In FIG. 1, a display control device 10 has a description reading unit 11, a page screen construction unit 12, a relationship specification unit 13, a placement processing unit 14, and a screen display unit 15.

The description reading unit 11 obtains screen data. The screen data is described by an application description. The application description includes a screen drawing description and a screen display description. The screen drawing description defines, for example, a type, a number, and the like of a view component, such as buttons and tables, included in a page screen. The screen display description defines a form of display, such as a shape, a size, and a color, of a view component included in a page screen.

The description reading unit 11 obtains a page screen group including, for example, a plurality of first type successive page screens and second type page screens dependent on the first type page screens. That is, the first type page screens are in parallel relationship to each other, and the first type page screens and the second type page screens are in dependent relationship. There is a case that a first page screen dependent on a certain page screen and a second page screen in parallel relationship thereto are included in a page screen group. In this case, focusing on the first page screen and the second page screen, they are in parallel relationship and thus both are first type page screens.

Then, the description reading unit 11 puts the screen data obtained in the form of application description into a form of screen configuration description (for example, HTML) to output it to the page screen construction unit 12.

The page screen construction unit 12 outputs a "reading target page screen", which is page screen data corresponding to a reading instruction signal or a next page screen reading command signal among the screen data obtained from the description reading unit 11, to the relationship specification unit 13. Here, the reading instruction signal is a signal to load a page screen corresponding to a "reference element" specified by a user while watching a display into the page screen construction unit 12. The "reference element" is a view component having a transfer instruction for a page screen to a link destination page screen embedded therein.

The relationship specification unit 13 specifies relationship between the reading target page screen and the linked page screen, i.e., parallel relationship or dependent relationship based on the reading target page screen received from the page screen construction unit 12 and a "relationship standard table" stored in a memory (not illustrated).

Specifically, a page screen includes the "reference element", which is a view component having a transfer instruction for the page screen to a link destination page screen embedded therein. FIG. 2 is a chart representing one example of the relationship standard table in the first embodiment. As represented in FIG. 2, in the relationship standard table, a plurality of positioning type candidates for the reference element are associated with inter-screen relationship in accordance with the respective positioning type candidates. The positioning type indicates positioning of a reference element included in the screen. For example, when a reference element is included in a list in a first page screen, a second page screen corresponding to the reference element is in dependent relationship with the first page screen, i.e., in parent-child membership. In addition, for example, when a reference element is included as an independent button screen in a first page screen, a second page screen corresponding to the reference element is in parallel relationship to the first page screen, for example, in permutation relationship.

Then, the relationship specification unit 13 outputs "inter-screen relationship information", which is information related to the specified relationship, and the reading target page screen received from the page screen construction unit 12 to the placement processing unit 14. The relationship specification unit 13 holds an inter-screen relationship table. The inter-screen relationship table is updated every time the inter-screen relationship is specified by the relationship specification unit 13. FIG. 3 is a chart representing one example of the inter-screen relationship table in the first embodiment.

The placement processing unit 14 receives a number N of "unit regions" included in a display window. Here, N is supposed to be a natural number of 2 or greater. An identification number of, for example, 1 through N is assigned to each of N items of the unit regions. A plurality of page screens is not displayed in one unit region. That is, such unit region is a basic unit to display a page screen.

The placement processing unit 14 controls the placement of the reading target page screen to a unit region based on the number N of unit regions, the inter-screen relationship information, and a status of an allocated page screen to a unit region. The placement processing unit 14 allocates, in particular, a first page screen and a second page screen among a plurality of page screens to a first unit region and a second unit region in one display window, respectively.

Specifically, in a case that a last reading target page screen is already allocated to a unit region n of other than the Nth unit region and also a current reading target page screen is in dependent relationship with the last reading target page screen, the placement processing unit 14 allocates the current reading target page screen to a unit region n+1. Here, n is a natural number of not less than 1 and not more than N−1. The current reading target page screen means a page screen as a target to be allocated to a unit region, i.e., an allocation target page screen. That is, in a case that there is an unallocated unit region and also the allocation target page screen is in dependent relationship with the last reading target page screen, the placement processing unit 14 allocates an allocation target page screen to a unit region next to a unit region allocated to the last reading target page screen.

Further, in a case that the last reading target page screen is already allocated to a unit region n' and also the current reading target page screen is in parallel relationship with a following reading target page screen, the placement processing unit 14 also allocates the current reading target page screen to a unit region n'+2 as well as the unit region n'+1. Here, n' is a natural number of not less than 1 and not more than N−2, i.e., the unit region n' is a unit region of other than the Nth and the (N−1)th unit regions. That is, in a case that there are two or more unallocated unit regions and also the allocation target page screen is in parallel relationship with the following reading target page screen, the placement processing unit 14 enlarges a size of the allocation target page screen. That is, the placement processing unit 14 executes "size enlargement process".

In addition, in a case that the last reading target page screen is already allocated to the Nth unit region and also the current reading target page screen is in dependent relationship with the last reading target page screen, the placement processing unit 14 shifts allocation destination unit regions for the already allocated reading target page screen one by one. Then, the placement processing unit 14 allocates the current reading target page screen to the Nth unit region. That is, in a case that there is no unallocated unit region and also the allocation target page screen is in dependent relationship with the last reading target page screen, the placement processing unit 14 executes "shift process".

In addition, in a case that the current reading target page screen is in parallel relationship with a reading target page screen already allocated to a unit region, the placement processing unit 14 allocates the current reading target page screen, instead, to the allocation destination unit region for the already allocated reading target page screen. That is, the placement processing unit 14 executes "replacement process". In this case, allocation of a unit region to the already allocated reading target page screen that is in parallel relationship with the current reading target page screen and also has dependent relationship with the already allocated reading target page screen is also reset.

In addition, the placement processing unit 14 outputs a command signal to read a reading target page screen next to the allocation target page screen, i.e., a next page screen reading command signal to the page screen construction unit 12. In such a manner, the page screen construction unit 12 outputs the reading target page screen next to the allocation target page screen to the relationship specification unit 13.

In this way, data of the plurality of page screens allocated to the plurality of unit regions, i.e., in-display frame screen data is outputted to the screen display unit 15 by the placement processing unit 14.

The screen display unit 15 outputs the in-display frame screen data received from the placement processing unit 14 to a display (not illustrated), thereby displaying a plurality of page screens in one display window. Although not described in detail here, the screen display unit 15 may alter the configuration and placement of each page screen in accordance with a display environment, such as a display size, same as the past.

Behavior of Display Control Device 10

A description is given to behaviors of the display control device 10 having the above configuration.

Figure 4:
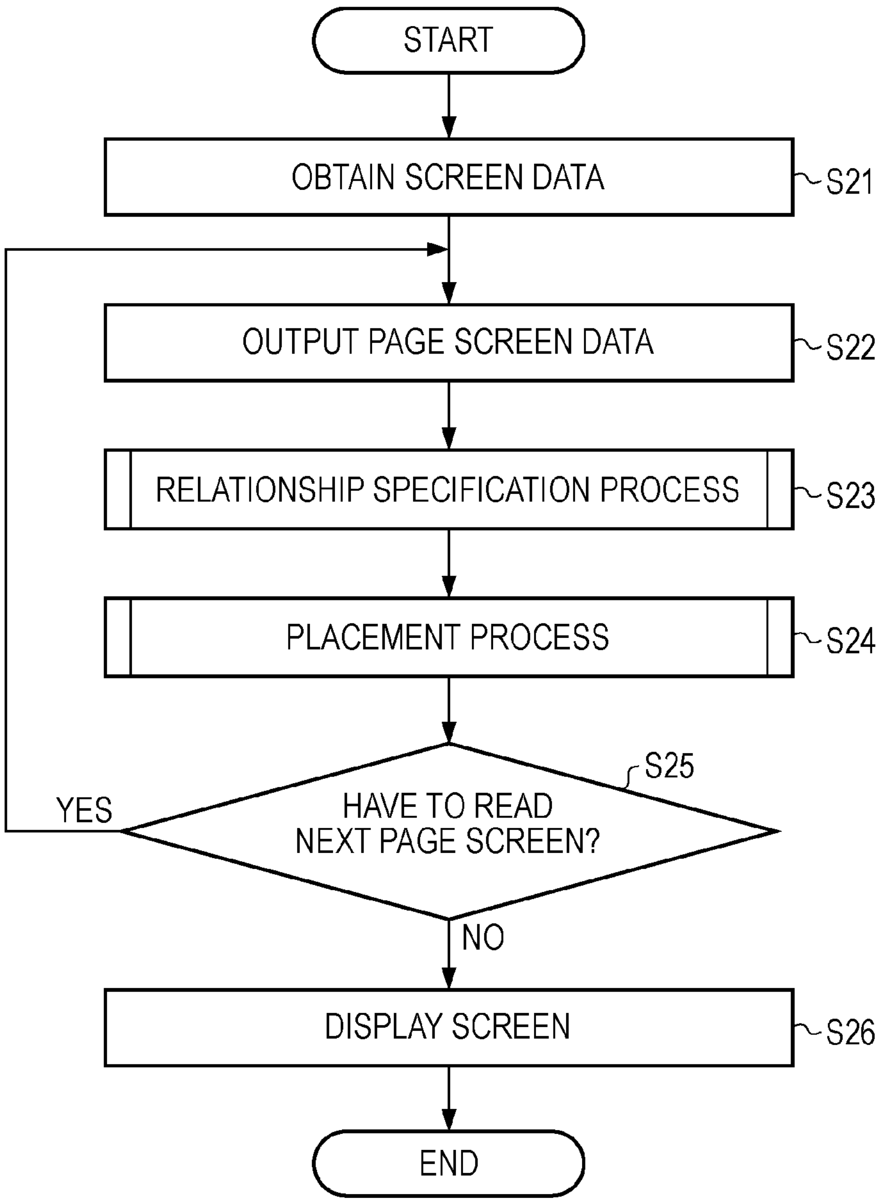
FIG. 4 is a flowchart representing one example of processing behaviors of the display control device in the first embodiment.

FIG. 4 is a flowchart representing one example of processing behaviors of the display control device 10 in the first embodiment.

The description reading unit 11 obtains screen data described by an application description (step S21). Specifically, the description reading unit 11 obtains a page screen group including a plurality of page screens. In the page screen group, a page screen pair having the above described dependent relationship or a page screen pair having the above described parallel relationship is included.

The page screen construction unit 12 outputs a reading target page screen, among the screen data obtained from the description reading unit 11, to the relationship specification unit 13 (step S22).

Figure 5:
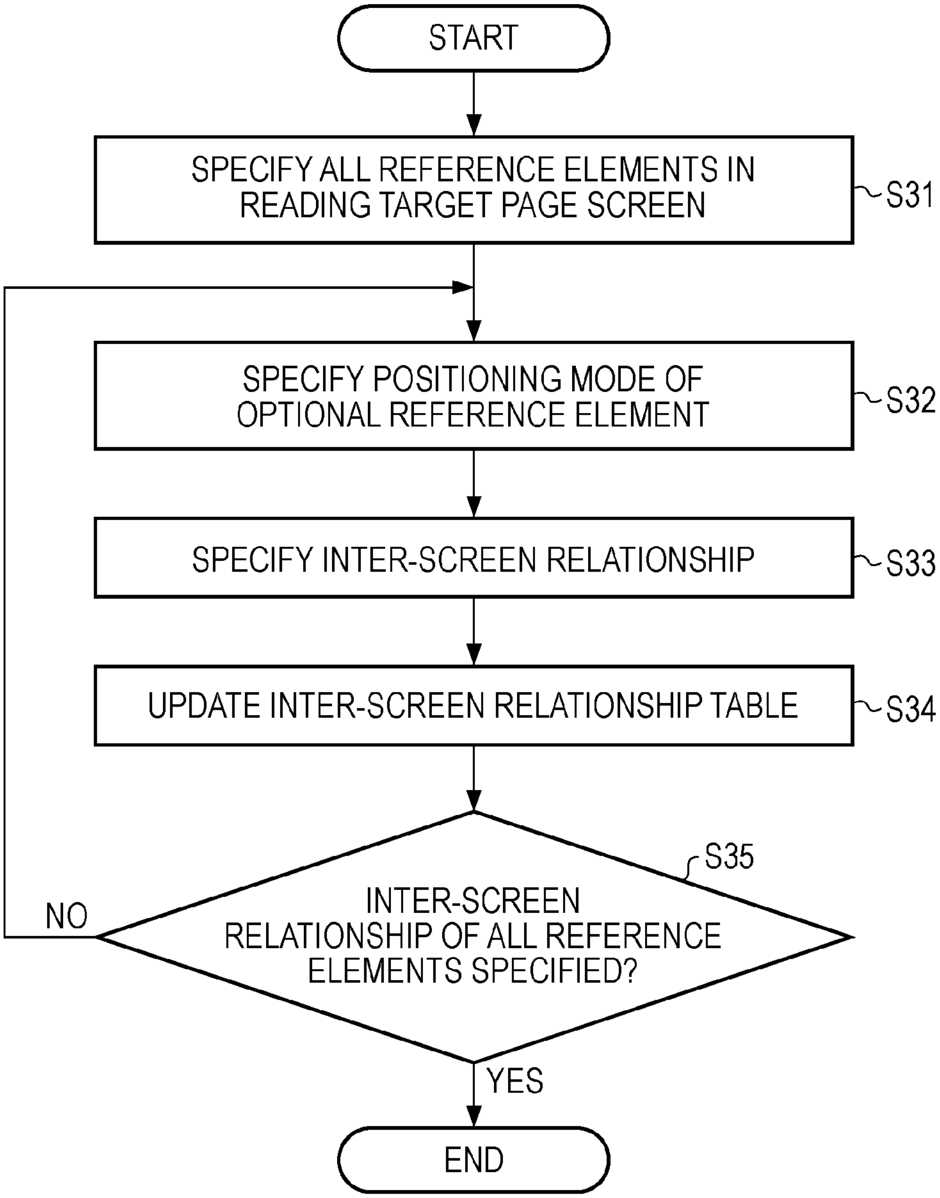
FIG. 5 is a flowchart representing one example of processing behaviors of relationship specification process.

The relationship specification unit 13 executes relationship specification process, represented in FIG. 5, that recognizes relationship between the reading target page screen and the linked page screen based on the reading target page screen received from the page screen construction unit 12 and the relationship standard table (step S23).

The placement processing unit 14 carries out placement process (step S24). That is, the placement processing unit 14 executes the placement process represented in FIG. 7 that controls placement of the reading target page screen to a unit region based on the number N of unit regions, the inter-screen relationship information, and the status of the allocated page screen to the unit region.

The placement processing unit 14 determines whether or not a next page screen has to be read (step S25). Specifically, the placement processing unit 14 allocates the current reading target page screen to one unit region in step S24, followed by determining whether or not there is a unit region not allocated to any. Then, in a case of determining that there is a unit region not allocated to any (yes in step S25), the placement processing unit 14 outputs a next page screen reading command signal to the page screen construction unit 12 because the next page screen has to be read.

In contrast, in a case of determining that the next page screen does not have to be read (no in step S25), the screen display unit 15 outputs the in-display frame screen data received from the placement processing unit 14 to the display, thereby displaying a plurality of page screens in one display frame (step S26).

<Relationship Specification Process>

FIG. 5 is a flowchart representing one example of processing behaviors of relationship specification process.

The relationship specification unit 13 specifies all reference elements included in the reading target page screen received from the page screen construction unit 12 (step S31).

The relationship specification unit 13 specifies a positioning type of an optional reference element among the plurality of reference elements specified in step S31 (step S32). Here, a positioning type includes, for example, a type included in a list, a type included as an independent button image, and the like.

The relationship specification unit 13 specifies inter-screen relationship based on the specified positioning type and the relationship standard table (step S33).

Figure 6:
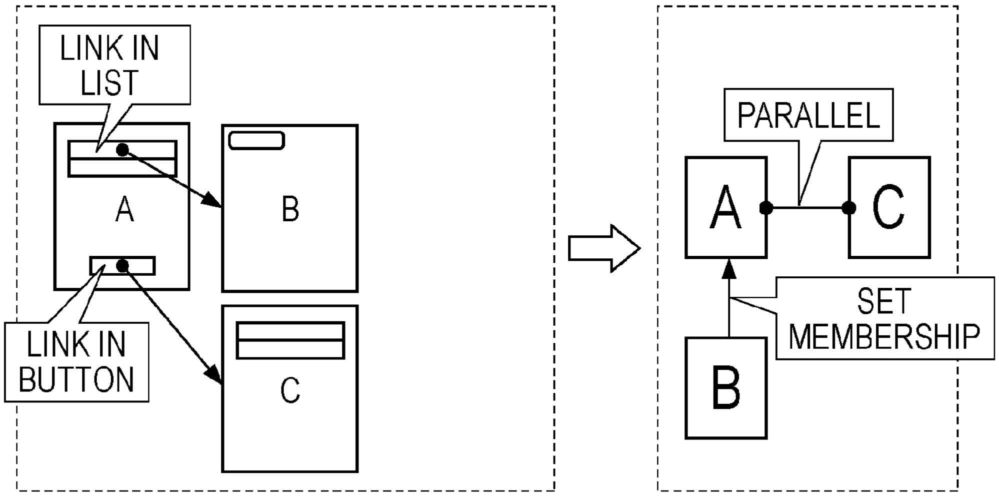
FIG. 6 is a chart for illustration of inter-screen relationship in the first embodiment.

FIG. 6 is a chart for illustration of the inter-screen relationship in the first embodiment. In FIG. 6, a page screen A is the reading target page screen. In the page screen A, a reference element linked with a page screen B is included. This reference element linked with the page screen B is included in the page screen A as a positioning type of being included in a list. Since the positioning type included in a link is associated with the dependent relationship in the relationship standard table, the relationship specification unit 13 can specify that the page screen B is a dependent screen of the page screen A. In addition, in the page screen A, a reference element linked with a page screen C is included. This reference element linked with the page screen C is included in the page screen A as a positioning type of being included as an independent button screen. Since the positioning type of being included as an independent button screen is associated with the parallel relationship in the relationship standard table, the relationship specification unit 13 can specify that the page screen C is parallel to the page screen A.

Going back to FIG. 5, the relationship specification unit 13 reflects the inter-screen relationship specified in step S33 in the inter-screen relationship table, thereby updating the inter-screen relationship table (step S34).

The relationship specification unit 13 determines whether or not all reference elements specified in step S31 are specified in the inter-screen relationship (step S35). In such a manner, the process in steps S32 through S34 is repeatedly carried out until finishing with all reference elements.

<Placement Process>

Figure 7:
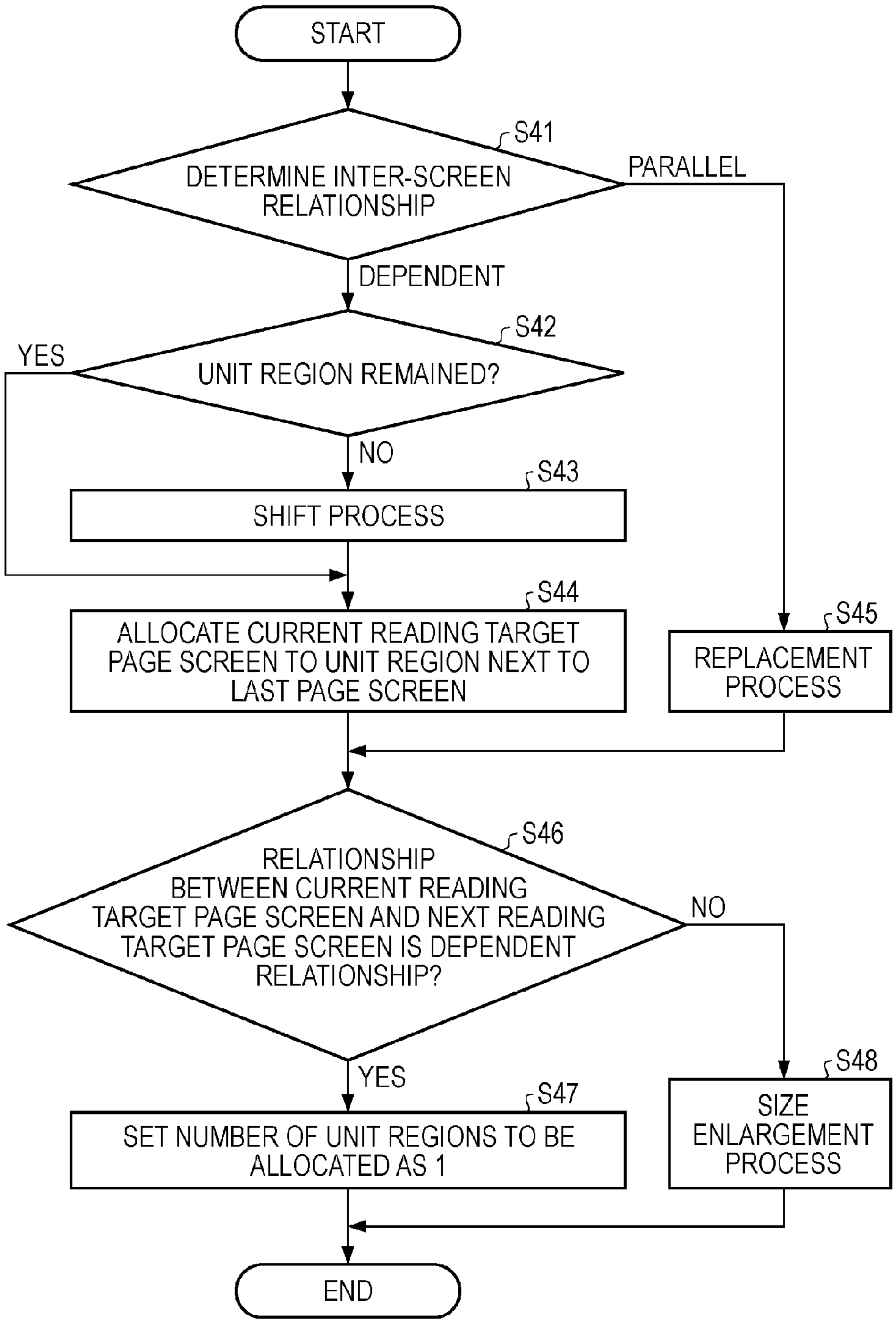
FIG. 7 is a flowchart representing one example of processing behaviors of placement process.

FIG. 7 is a flowchart representing one example of processing behaviors of the placement process. FIGS. 8A, 8B, 8C, 8D, and 8E are diagrams for illustration of the placement process in the first embodiment.

The placement processing unit 14 determines inter-screen relationship of the last reading target page screen and the current reading target page screen (step S41).

In a case of determining as the dependent relationship in step S41, the placement processing unit 14 determines whether or not there is an unallocated unit region (step S42).

In a case of determining that there is no unallocated unit region in step S42 (no in step S42), the placement processing unit 14 executes the shift process (step S43). That is, in a case that there is no unallocated unit region and also the current reading target page screen is in dependent relationship with the last reading target page screen, the placement processing unit 14 shifts the allocation destination unit regions for the already allocated reading target page screen one by one (step S43). Then, the placement processing unit 14 allocates the current reading target page screen to a unit region next to the allocation destination unit region for the last reading target page screen, here, a rearmost unit region (step S44).

Figure 8A:
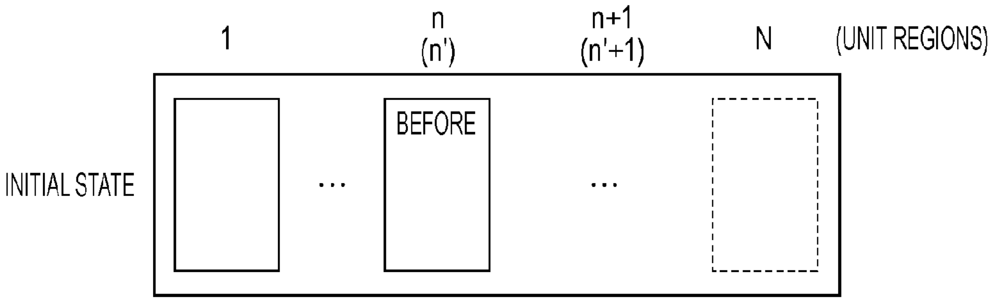
FIGS. 8A, 8B, 8C, 8D, and 8E are diagrams for illustration of the placement process in the first embodiment.
Figure 8B:
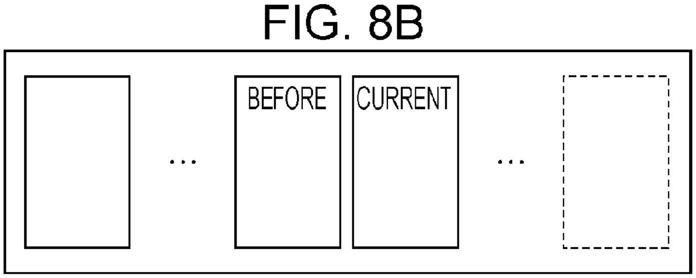
Figure 8C:
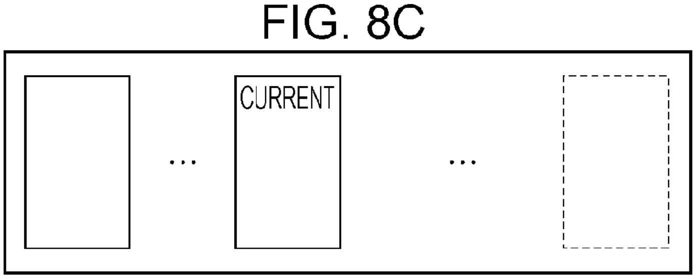

In a case of determining that there is an unallocated unit region in step S42 (yes in step S42), the placement processing unit 14 allocates the current reading target page screen to a unit region next to the allocation destination unit region for the last reading target page screen (step S44). That is, in a case that a situation illustrated in FIG. 8A is a situation before allocating the current reading target page screen, a situation as illustrated in FIG. 8B is obtained in step S44.

In contrast, in a case of determining as the parallel relationship in step S41, the placement processing unit 14 executes the replacement process (step S45). That is, in a case that the current reading target page screen is in parallel relationship with a reading target page screen already allocated to a unit region, the placement processing unit 14 allocates the current reading target page screen, instead, to the allocation destination unit region for the already allocated reading target page screen (refer to FIG. 8C).

The placement processing unit 14 determines whether or not the relationship between the current reading target page screen and the following reading target page screen is dependent relationship (step S46). The following reading target page screen is, for example, a page screen linked with a top reference element among the reference elements included in the current reading target page screen.

Figure 8D:
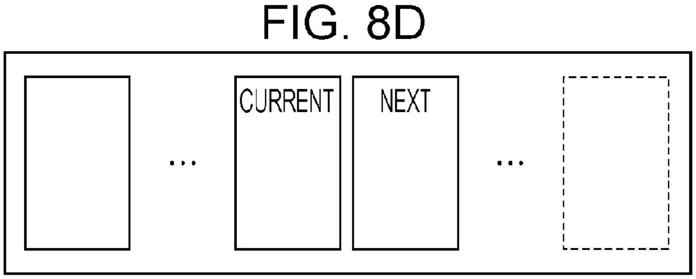
Figure 8E:
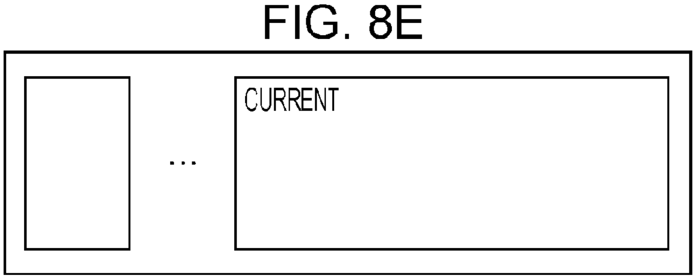

Then, in a case of determining as the dependent relationship in step S46 (yes in step S46), the placement processing unit 14 sets a number of unit regions allocated to the current reading target page screen as 1 (step S47, refer to FIG. 8D).

In a case of determining as not in dependent relationship in step S46, i.e., a case of determining as the parallel relationship (no in step S46), the placement processing unit 14 executes the size enlargement process when there is any unallocated unit region (step S48). That is, the placement processing unit 14 allocates a unit region next to the unit region that is allocated to the current reading target page screen also to the current reading target page screen in step S44 or S45. Not only the next unit region, all unallocated unit regions may also be allocated to the current reading target page screen (refer to FIG. 8E).

Next, screen placement process is described using specific examples.

Figure 9:
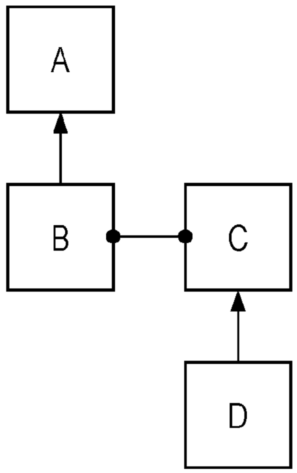
FIG. 9 is a diagram illustrating a first example of inter-page screen relationship in the first embodiment.
Figure 10:
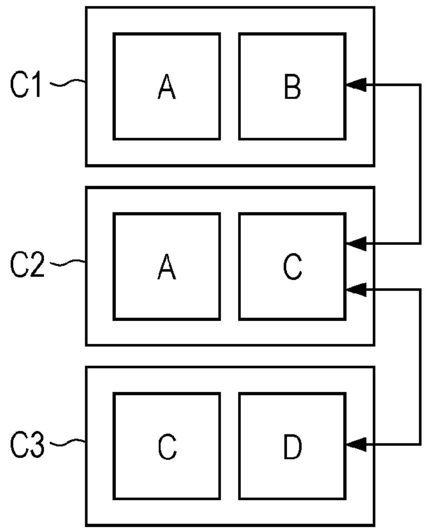
FIG. 10 is a diagram for illustration of screen placement in the first embodiment.

(1) Firstly, a description is given to a case that relationship of the page screens is the relationship illustrated in FIG. 9 and also there are two unit regions. FIG. 9 is a diagram illustrating a first example of inter-page screen relationship in the first embodiment. FIG. 10 is a diagram for illustration of screen placement in the first embodiment.

As represented in FIG. 9, there is a page screen B as a dependent screen of a page screen A, there is a page screen C as a parallel screen of the page screen B, and there is a page screen D as a dependent screen of the page screen C.

Then, as the page screen B is read in a situation where the page screen A is allocated to a unit region 1, the page screen B is in dependent relationship with the page screen A, which is the last reading target page screen, so that the page screen B is allocated to a unit region 2 next to the unit region 1 (refer to situation C1 in FIG. 10).

As the page screen C is read in situation C1, the page screen C is in parallel relationship with the page screen B, which is the last reading target page screen, so that the page screen C is allocated to the unit region 2 allocated to the page screen B (refer to situation C2 in FIG. 10).

As the page screen D is read in situation C2, the page screen D is in dependent relationship with the page screen C, which is the last reading target page screen, and also there is no unallocated unit region, so that the shift process is executed and the page screen D is allocated to the unit region 2 (refer to situation C3 in FIG. 10).

Figure 11:
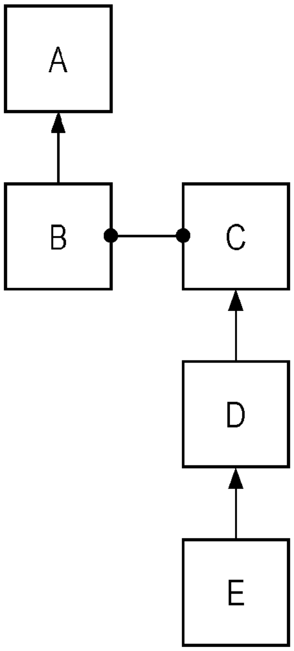
FIG. 11 is a diagram illustrating a second example of the inter-page screen relationship in the first embodiment.
Figure 12:
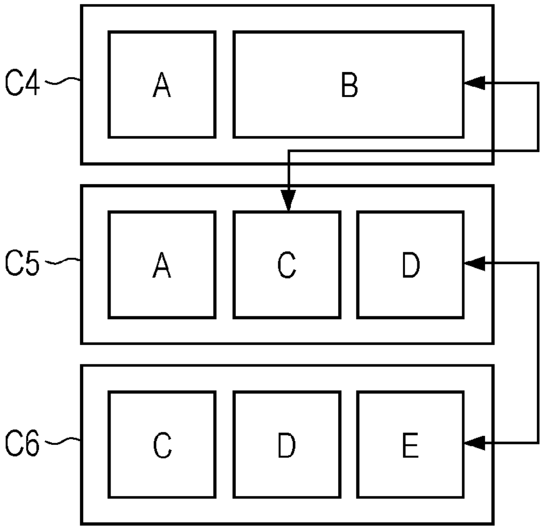
FIG. 12 is a diagram for illustration of the screen placement in the first embodiment.

(2) Next, a description is given to a case where relationship of the page screens is the relationship illustrated in FIG. 11 and also there are three unit regions. FIG. 11 is a diagram illustrating a second example of the inter-page screen relationship in the first embodiment. FIG. 12 is a diagram for illustration of the screen placement in the first embodiment.

As represented in FIG. 11, there is a page screen B as a dependent screen of a page screen A, there is a page screen C as a parallel screen of the page screen B, there is a page screen D as a dependent screen of the page screen C, and there is a page screen E as a dependent screen of the page screen D.

Then, as the page screen B is read in a situation where the page screen A is allocated to a unit region 1, the page screen B is in dependent relationship with the page screen A, which is the last reading target page screen, so that the page screen B is allocated to a unit region 2 next to the unit region 1. Further, the page screen C next to the page screen B is in parallel relationship with the page screen B, so that the size enlargement process is executed to the page screen B (refer to situation C4 in FIG. 12). That is, the page screen B is allocated not only to the unit region 2 but also to a unit region 3.

As the page screen C is read in situation C4, the page screen C is in parallel relationship with the page screen B, which is the last reading target page screen, so that the page screen C is allocated to the unit region 2 to which the page screen B is allocated. Then, the page screen D, which is a reading target page screen next to the page screen C, is in dependent relationship with the page screen C, so that the size enlargement process is not carried out to the page screen C. In this situation, as the page screen D is read, the unit region 3 is allocated to the page screen D (refer to situation C5 in FIG. 12).

As the page screen E is read in situation C5, the page screen E is in dependent relationship with the page screen D, which is the last reading target page screen, and also there is no unallocated unit region, so that the shift process is executed and the page screen E is allocated to the unit region 3 (refer to situation C6 in FIG. 12).

As just described, according to the present embodiment, in the display control device 10, the placement processing unit 14 allocates a first page screen and a second page screen among a plurality of page screens respectively to a first unit region and a second unit region in one display window. Then, the screen display unit 15 displays the one display window, having the first page screen and the second page screen placed in the first unit region and the second unit region, on a display.

This enables to display a plurality of page screens in one display window, and thus allows an increase in an amount of information displayed in the display window.

The relationship specification unit 13 specifies the relationship between the first page screen and the second page screen, and the placement processing unit 14 allocates the first page screen and the second page screen to the first unit region and the second unit region at a same timing in a case that the first page screen and the second page screen are in dependent relationship.

This enables to display screens across a plurality of levels in one display window, and thus allows improvement in convenience for a user.

Specifically, the relationship specification unit 13 specifies a reference element, which is a image component having a transfer instruction to the link destination page screen embedded therein, and specifies the inter-screen relationship based on the relationship standard table in which a plurality of positioning type candidates of the reference element are associated with inter-screen relationship in accordance with the respective positioning type candidates, and the specified reference elements.

When a first page screen is the reading target page screen of the last time, a second page screen is the reading target page screen of this time, and a third page screen is the reading target page screen for the next time, the placement processing unit 14 allocates a third unit region in addition to the second unit region to the second page screen, which is in parallel relationship with the third page screen. That is, the placement processing unit 14 executes the size enlargement process.

This enables to effectively utilize the third unit region without putting it into a situation not allocated to any page screen.

In a case that the third page screen next to the second page screen is in dependent relationship with the second page screen, the placement processing unit 14 relocates the second page screen to the first unit region and allocates the third page screen to the second unit region. That is, the placement processing unit 14 executes the shift process.

This enables to display in priority to page screens in close levels when reading the third page screen, and thus allows further improvement in convenience for a user.

Second Embodiment

In the first embodiment, it is premised that a number of unit regions in a display window is fixed. In contrast, in a second embodiment, the number of unit regions in a display window can be switched.

Configuration of Display Control Device 50

Figure 13:
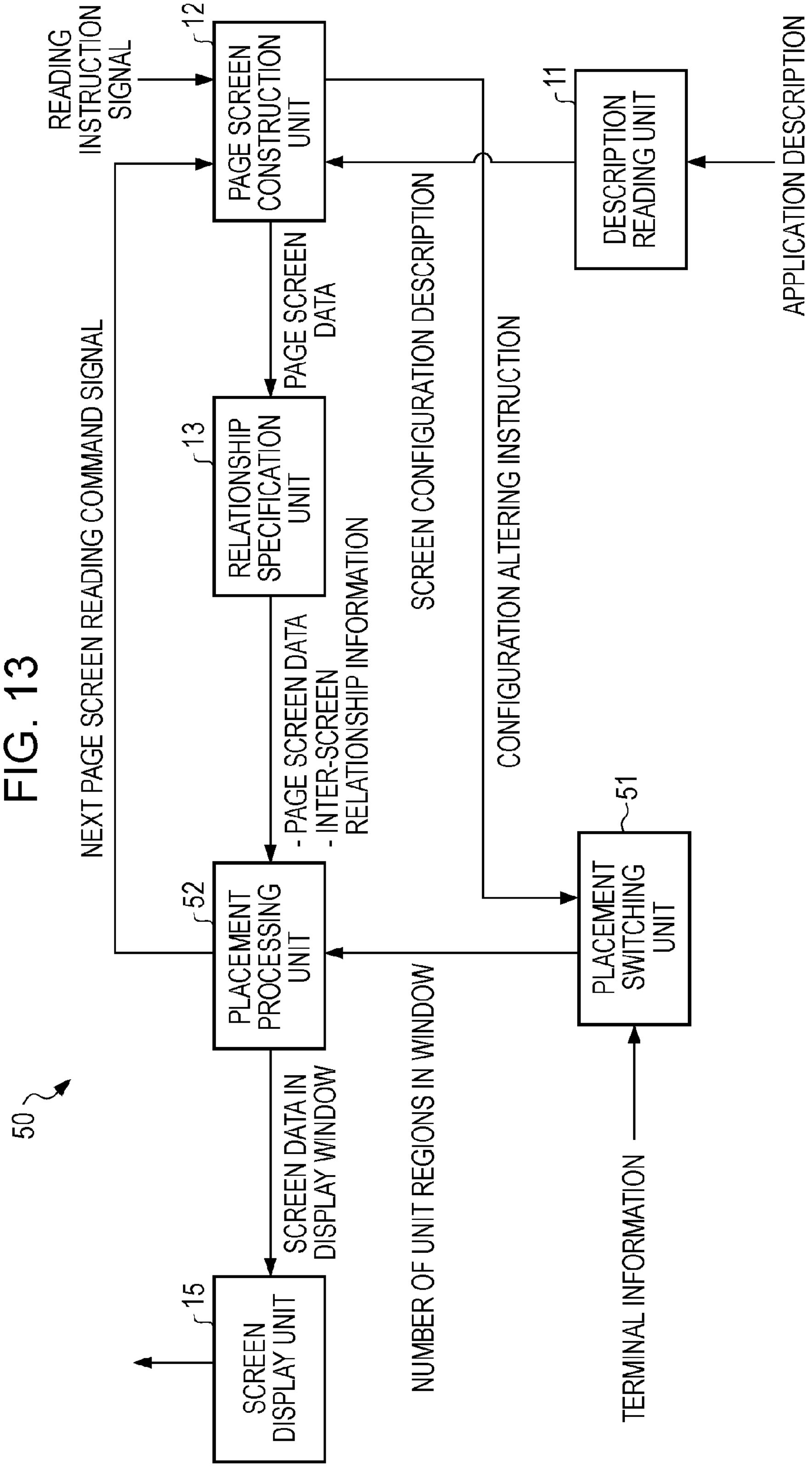
FIG. 13 is a block diagram illustrating one example of a display control device in a second embodiment.

FIG. 13 is a block diagram illustrating one example of a display control device in the second embodiment. In FIG. 13, the display control device 50 has a placement switching unit 51 and a placement processing unit 52.

The placement switching unit 51 obtains terminal information from a terminal connected to the display control device 50. The terminal information includes a display size of the terminal.

The placement switching unit 51 decides, in an initial state, a number of unit regions in a window in accordance with the display size. For example, the placement switching unit 51 holds a region number deciding table in which a plurality of display size candidates are associated with respective numbers of unit regions in accordance with the respective display size candidates. Then, the placement switching unit 51 specifies the number of unit regions associated with an inputted display size in the region number deciding table. The number of unit regions thus decided is outputted to the placement processing unit 52.

In addition, the placement switching unit 51 alters a number of unit regions in accordance with a configuration altering instruction. The configuration altering instruction can include, for example, (1) instruction by menus, keys, buttons, and the like, (2) instruction by a pinch-in, a pinch-out, and the like, (3) instruction by an operation to rotate a screen, and (4) instruction based on a detected distance between the display and the user. In a case of (4), the distance between the display and the user may be obtained by image recognition with a camera or may also be obtained using a proximity sensor.

The placement processing unit 52 basically has functions similar to the placement processing unit 14 in the first embodiment.

In addition, the placement processing unit 52 receives a number N' of unit regions after alteration. Here, N' is supposed to be a natural number of 2 or greater. Then, the placement processing unit 52 controls placement of the allocated page screen or the reading target page screen to a unit region based on a number N of unit regions before alteration, the number N' of unit regions after alteration, the inter-screen relationship information, and the status of an allocated page screen to a unit region.

Specifically, the placement processing unit 52 determines whether the number of unit regions increases or decreases depending on the magnitude relationship of the number N of unit regions before alteration and the number N' of unit regions after alteration.

Then, in a case that the number of unit regions is decreased, i.e., N'<N, the placement processing unit 52 allocates N' types of page screens allocated to starting from the unit region N in order among the N items of already allocated page screens again to the unit regions after alteration.

In addition, in a case that the number of unit regions is increased, the placement processing unit 52 handles the N items of already allocated page screens without change. Here, since it turns out that there is an unallocated unit region in a case of increasing the number of unit regions, the placement processing unit 52 carries out process to load a next page screen. Then, in a case that a page screen allocated to a unit region N, i.e., the page screen read lastly and the next reading target page screen are in parallel relationship, the placement processing unit 52 carries out the size enlargement process to the page screen allocated to the unit region N.

Behavior of Display Control Device 50

Figure 14:
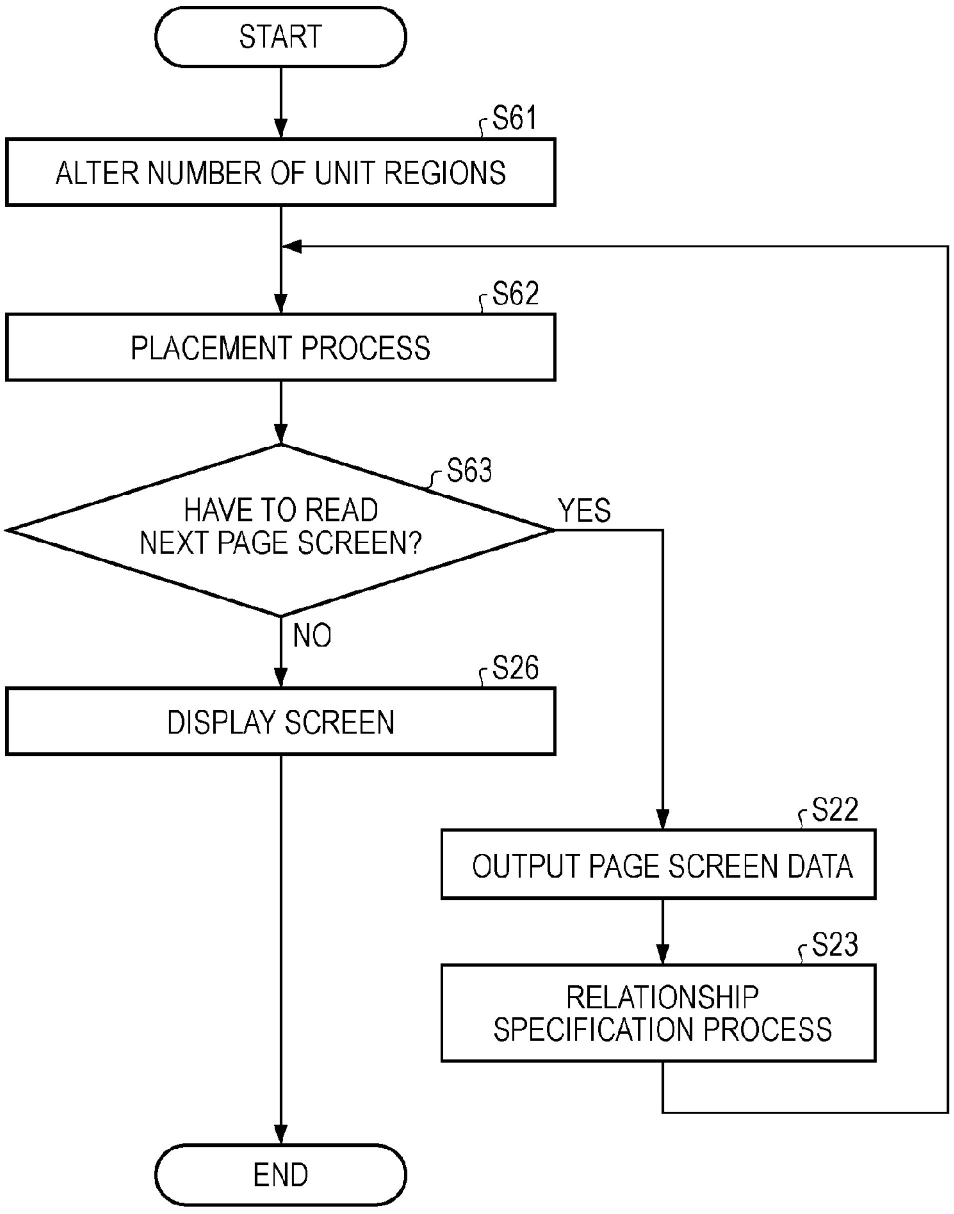
FIG. 14 is a flowchart representing one example of processing behaviors of the display control device in the second embodiment.

FIG. 14 is a flowchart representing one example of processing behaviors of the display control device 50 in the second embodiment.

In step S61, when receiving a configuration altering instruction, the placement switching unit 51 alters a number of unit regions.

In step S62, the placement processing unit 52 carries out the placement process. Specifically, in a case that the number of unit regions is decreased, i.e., N'<N, the placement processing unit 52 allocates N' types of page screens allocated to starting from the unit region N in order among the N items of already allocated page screens again to the unit regions after alteration. In addition, in a case that the number of unit regions is increased, the placement processing unit 52 handles the N items of already allocated page screens without change.

In step S63, the placement processing unit 52 determines whether or not a next page screen has to be read. Specifically, in a case that the number of unit regions is increased, the placement processing unit 52 determines that the next page screen has to be read and outputs a next page screen reading command signal to the page screen construction unit 12. In a case that the number of unit regions is decreased, the placement processing unit 52 determines that the next page screen does not have to be read.

Next, the screen placement process accompanied by alteration of a number of unit regions is described using a specific example.

Figure 15:
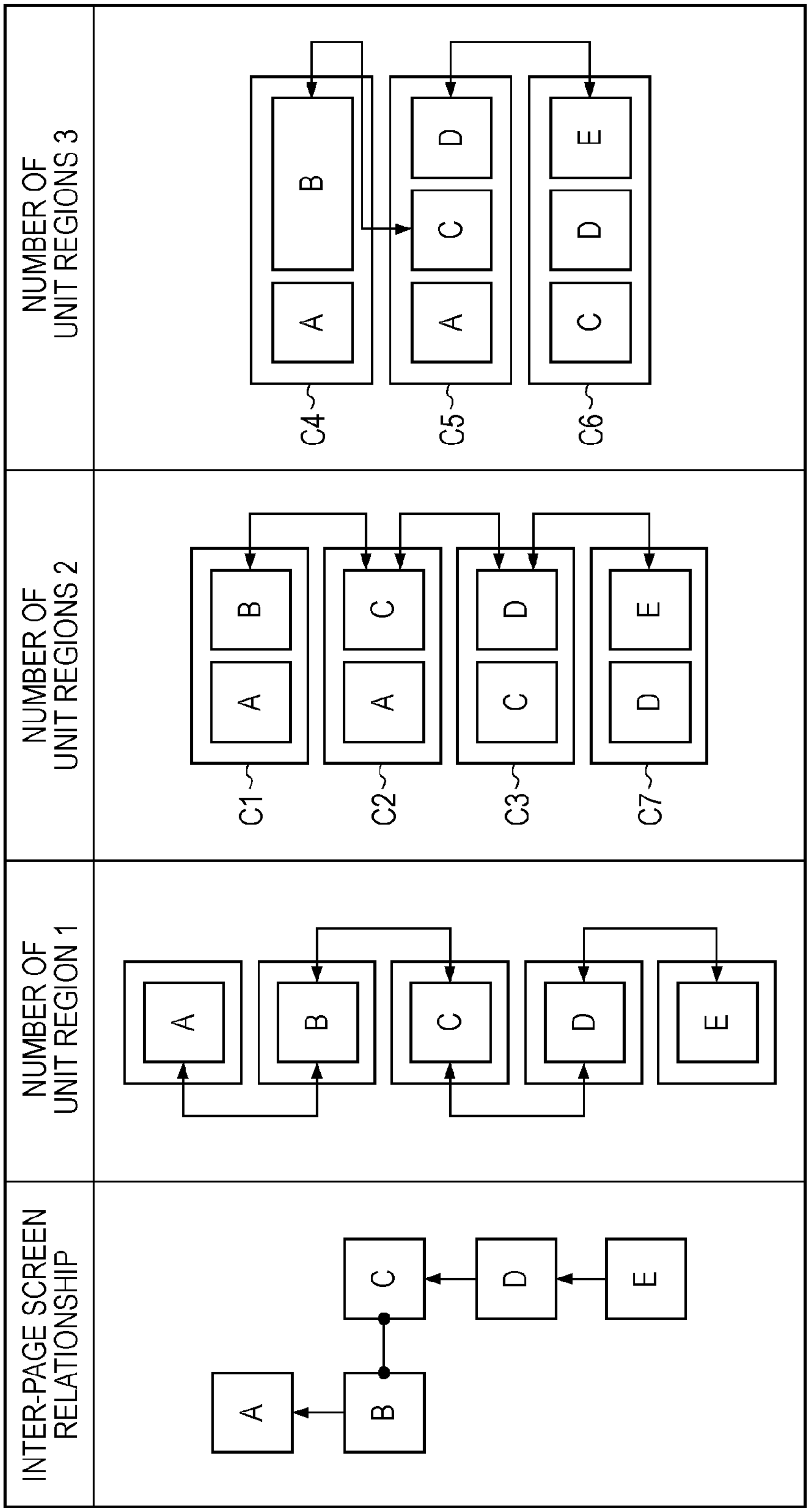
FIG. 15 is a chart for illustration of the screen placement process accompanied by alteration of a number of unit regions in the second embodiment.

FIG. 15 is a chart for illustration of the screen placement process accompanied by alteration of a number of unit regions in the second embodiment. In FIG. 15, one example of inter-page screen relationship is illustrated. Then, in FIG. 15, screen placement situation candidate groups in respective cases that the number of unit regions is from 1 to 3 are illustrated.

Firstly, a description is given to a case that the number of unit regions decreases from 3 to 2.

In a case that the number of unit regions is altered from 3 to 2 in situation C4, two types of page screens allocated from the unit region 3, i.e., the page screen B and the page screen A are allocated again to the unit regions 2 and 1 (refer to situation C1).

In a case that the number of unit regions is altered from 3 to 2 in situation C5, two types of page screens allocated from the unit region 3, i.e., the page screen D and the page screen C are allocated again to the unit regions 2 and 1 (refer to situation C3). In contrast, in a case that the number of unit regions is altered after displaying pages from situation C6 to situation C5, two types of page screens allocated from the unit region 1, i.e., the page screen A and the page screen C are allocated to the unit regions 1 and 2 (refer to situation C2).

In a case that the number of unit regions is altered from 3 to 2 in situation C6, two types of page screens allocated from the unit region 3, i.e., the page screen E and the page screen D are allocated again to the unit regions 2 and 1 (refer to situation C7).

Next, a description is given to a case that the number of unit regions increases from 2 to 3.

In a case that the number of unit regions is altered from 2 to 3 in situation C1, already allocated two page screens, i.e., the page screen A and the page screen B are handled without change. That is, the page screen A and the page screen B are allocated again to the unit regions 1 and 2. Then, since relationship between the page screen B and the next page screen C are in parallel relationship, the page screen B is subjected to the size enlargement process (refer to situation C4).

As just described, according to the present embodiment, in the display control device 50, the placement switching unit 51 alters a number of unit regions in accordance with a configuration altering instruction.

This enables to display page screens depending on a number of unit regions in accordance with a configuration altering instruction by a user, and thus allows further improvement in convenience for a user.

Other Embodiments

[1] The process of the placement processing unit and the relationship specification unit in the first embodiment and the second embodiment and of the placement switching unit in the second embodiment can be achieved as an application execution environment, for example, functions of a web browser and can also be achieved as an application, for example, functions of a library.

[2] In addition, each component of each part illustrated in the first embodiment and the second embodiment does not have to be physically configured as illustrated. That is, the specific forms of distribution and integration of each part are not limited to those illustrated, and they can also be configured by, in whole or in part, functional or physical distribution and integration in an optional unit in accordance with various loads, the status of use, and the like.

Further, various processing functions carried out in each device may also be executed on, in whole or in part optionally, a CPU (central processing unit) (or a microcomputer, such as an MPU (micro processing unit) and an MCU (micro controller unit)). In addition, naturally, the various processing functions may also be executed on, in whole or in part optionally, a program to be executed for analysis with a CPU (or a microcomputer, such as an MPU and an MCU) or hardware by a wired logic.

Figure 16:
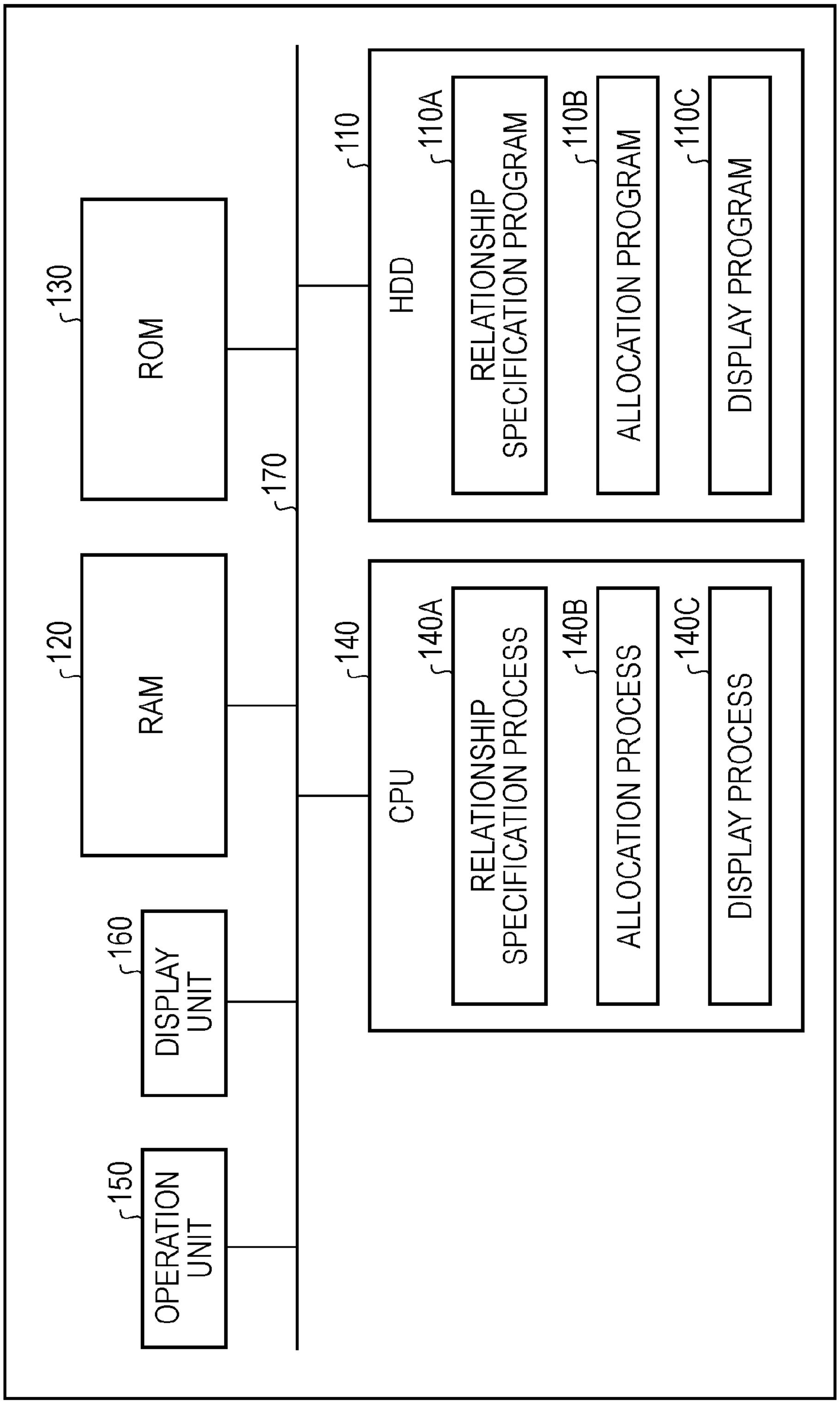
FIG. 16 is a diagram to illustrate a computer that executes a display control program.

The various types of process described in the first embodiment and the second embodiment can be achieved by executing a program prepared in advance on a computer. With that, one example of a computer that executes a program having functions equivalent to above embodiments is described below. FIG. 16 is a diagram to illustrate a computer that executes a display control program.

A computer 100 that executes a display control program illustrated in FIG. 16 has an HDD (hard disk drive) 110, a RAM 120, a ROM 130, and a CPU 140. Further, the computer 100 has an operation unit 150 and a display unit 160. Then, in the computer 100, the HDD 110, the RAM 120, the ROM 130, the CPU 140, the operation unit 150, and the display unit 160 are connected via a bus 170.

Then, in the HDD 110, a display control program is stored in advance that exhibits the functions equivalent to the embodiments described above. In the HDD 110, an application is also stored. The display control program may also be recorded in, not the HDD 110, but the ROM 130 or a recording medium that is computer-readable with a drive, not illustrated. The recording medium may be, for example, a portable recording medium, such as a CD-ROM, a DVD disk, and a USB memory, a semiconductor memory, such as a flash memory, and the like. The display control program is, as illustrated in FIG. 16, a relationship specification program 110A, an allocation program 110B, and a display program 110C. The programs 110A, 110B, and 110C may also be integrated or distributed appropriately.

Then, the CPU 140 reads these programs 110A, 110B, and 110C out of the HDD 110. Then, as illustrated in FIG. 16, the CPU 140 starts functioning as a relationship specification process 140A, an allocation process 140B, and a display process 140C by the readout of the respective programs 110A, 110B, and 110C. In the RAM 120, a page screen thus read, for example, is developed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable medium encoded with a computer program causing a memory and a hardware processor to execute a display control process comprising:

reading page screens sequentially, respective page screens including a reference element being a view component having a transfer instruction to a link destination page screen embedded therein;

specifying an inter-screen relationship between a first page screen and a second page screen indicative of one of a dependent relationship and a parallel relationship, based on the reference element embedded in the first page screen;

specifying an inter-screen relationship between the second page screen and a third page screen indicative of one of a dependent relationship and a parallel relationship, based on the reference element embedded in the second page screen such that the first page screen is a last reading target page screen, the second page screen is a current reading target page screen, and the third page screen is a next reading target page screen to be read after displaying the second page screen;

specifying a number of unit regions in one display window on a screen display of a device;

allocating, based on the inter-screen relationships and the specified number of unit regions, the first page screen to a first unit region in the one display window and the second page screen to a second unit region and a third unit region next to the second unit region in the one display window, so that the second page screen is displayed in an enlarged size of two unit regions, in a case that the first page screen and the second page screen are in the dependent relationship, and the second page screen and the third page screen are in the parallel relationship; and displaying the one display window, as the screen display of the device, having the first page screen placed in the first unit region, the second page screen placed in the second unit region and the third unit region, until the third page screen is read.

2. The non-transitory computer-readable medium according to claim 1, wherein the specifying the inter-screen relationship includes specifying the reference element, and determining the inter-screen relationship based on the specified reference element and a table in which a plurality of positioning type candidates for the reference element are associated with one of the dependent inter-screen relationship and the parallel inter-screen relationship in accordance with the respective positioning type candidates.

3. The non-transitory computer-readable medium according to claim 1, wherein in a case that the third page screen is in dependent relationship with the second page screen, and there is no unallocated unit region, the display control process further comprises executing a shift operation by relocating the second page screen to the first unit region and allocating the third page screen to the second unit region, when reading the third page screen.

4. The non-transitory computer-readable medium according to claim 1, wherein the display control process further comprises altering a number of unit regions in the display window.

5. The non-transitory computer-readable medium according to claim 1, wherein in a case that the third page screen is in parallel relationship with the second page screen, the display control process further comprises executing a replacement operation by allocating the third page screen to the second unit region, when reading the third page screen.

6. A display control device comprising:

a memory and a hardware processor configured to read page screens sequentially, respective page screens including a reference element being a view component having a transfer instruction to a link destination page screen embedded therein;

specify an inter-screen relationship between a first page screen and a second page screen indicative of one of a dependent relationship and a parallel relationship, based on the reference element embedded in the first page screen;

specify an inter-screen relationship between the second page screen and a third page screen indicative of one of a dependent relationship and a parallel relationship, based on the reference element embedded in the second page screen such that the first page screen is a last reading target page screen, the second page screen is a current reading target page screen, and the third page screen is a next reading target page screen to be read after displaying the second page screen;

specify a number of unit regions in one display window on a screen display of a device;

allocate, based on the inter-screen relationships and the specified number of unit regions, the first page screen to a first unit region in the one display window and the second page screen to a second unit region and a third unit region next to the second unit region in the one display window, so that the second page screen is displayed in an enlarged size of two unit regions, in a case that the first page screen and the second page screen are in the dependent relationship, and the second page screen and the third page screen are in the parallel relationship; and display the one display window, as the screen display of the device, having the first page screen placed in the first unit region, the second page screen placed in the second unit region and the third unit region, until the third page screen is read.

7. A display control method comprising:

reading page screens sequentially, respective page screens including a reference element being a view component having a transfer instruction to a link destination page screen embedded therein;

specifying an inter-screen relationship between a first page screen and a second page screen indicative of one of a dependent relationship and a parallel relationship, based on the reference element embedded in the first page screen;

specifying an inter-screen relationship between the second page screen and a third page screen indicative of one of a dependent relationship and a parallel relationship, based on the reference element embedded in the second page screen such that the first page screen is a last reading target page screen, the second page screen is a current reading target page screen, and the third page screen is a next reading target page screen to be read after displaying the second page screen;

specifying a number of unit regions in one display window on a screen display of a device;

allocating, based on the inter-screen relationships and the specified number of unit regions, the first page screen to a first unit region in the one display window and the second page screen to a second unit region and a third unit region next to the second unit region in the one display window, so that the second page screen is displayed in an enlarged size of two unit regions, in a case that the first page screen and the second page screen are in the dependent relationship, and the second page screen and the third page screen are in the parallel relationship; and displaying the one display window, as the screen display of the device, having the first page screen placed in the first unit region, the second page screen placed in the second unit region and the third unit region, until the third page screen is read.

* * * * *